(No Model.) 6 Sheets—Sheet 1.
E. M. SKINNER.
PIPE ORGAN.
No. 595,660. Patented Dec. 14, 1897.
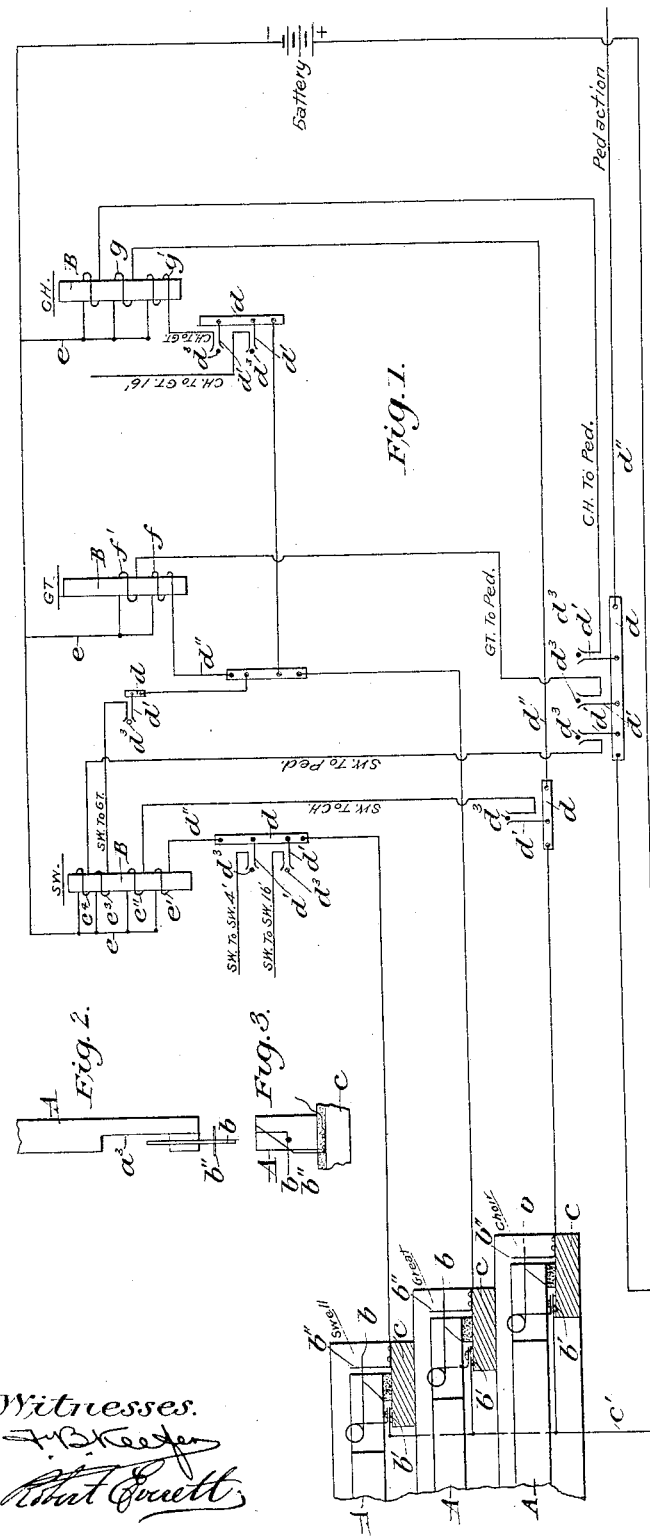

(No Model.) 6 Sheets—Sheet 2.
E. M. SKINNER.
PIPE ORGAN.
No. 595,660. Patented Dec. 14, 1897.
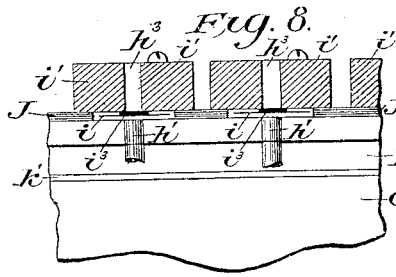
Fig. 8.
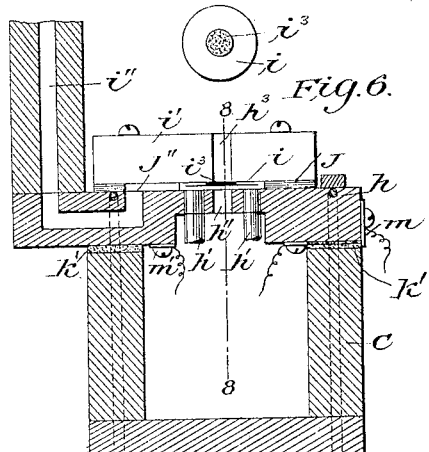
Fig. 6.
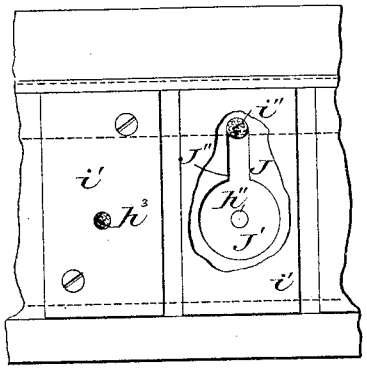
Fig. 9.
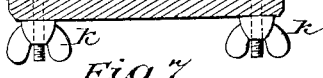
Fig. 7.
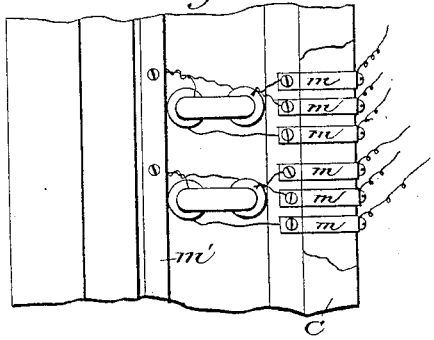
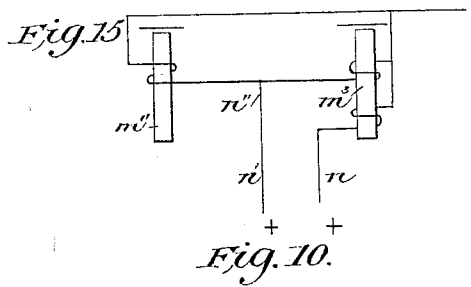
Fig. 15.
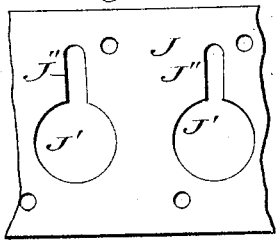
Fig. 10.
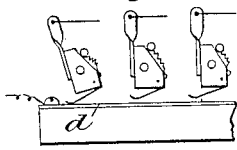
Fig. 11. Fig. 12.
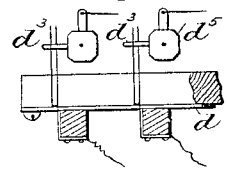
Fig. 13. Fig. 14.
Witnesses.
H. B. Keefer
Robert Everett
Inventor:
Ernest M. Skinner.
By James L. Norris
Atty.

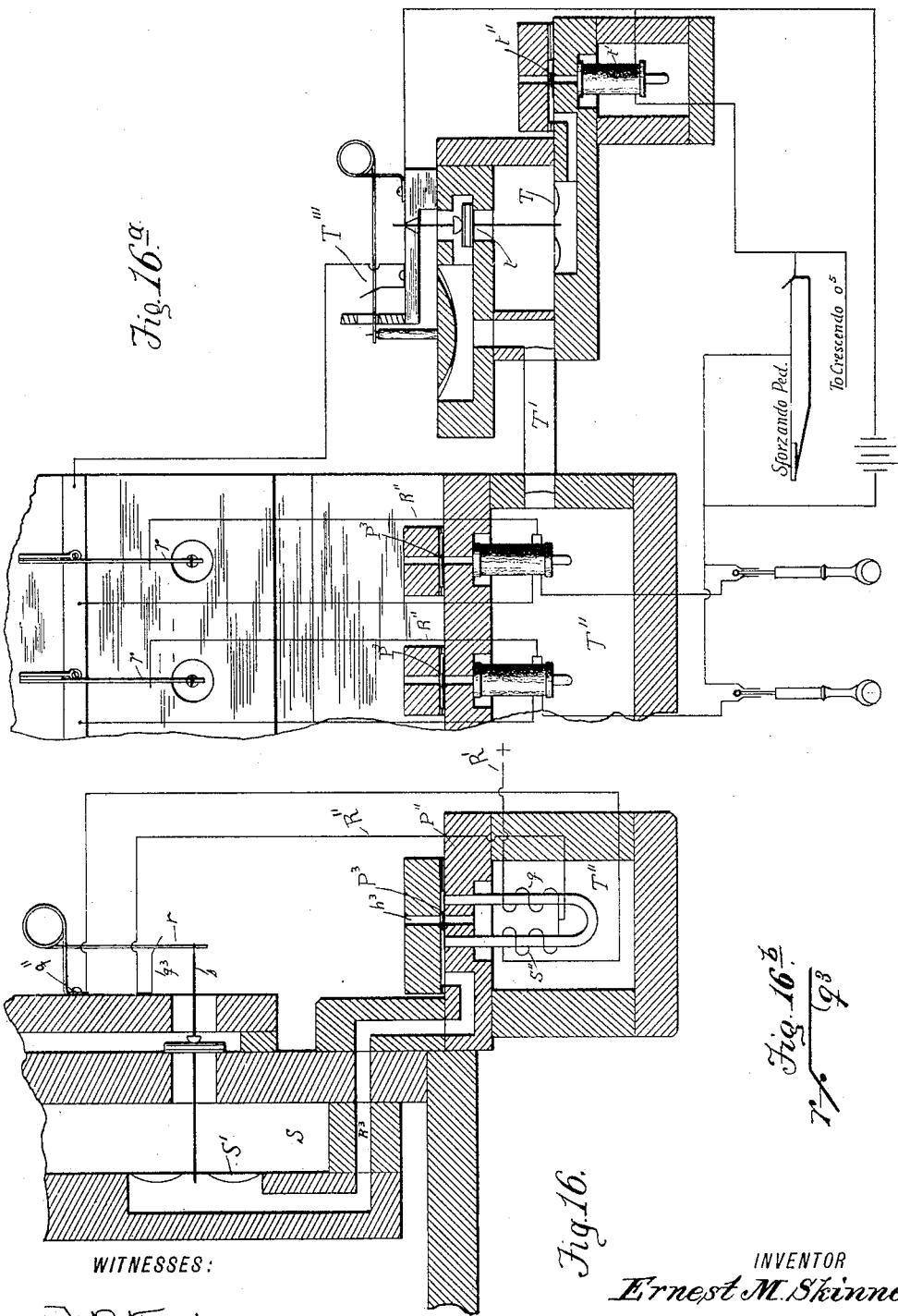

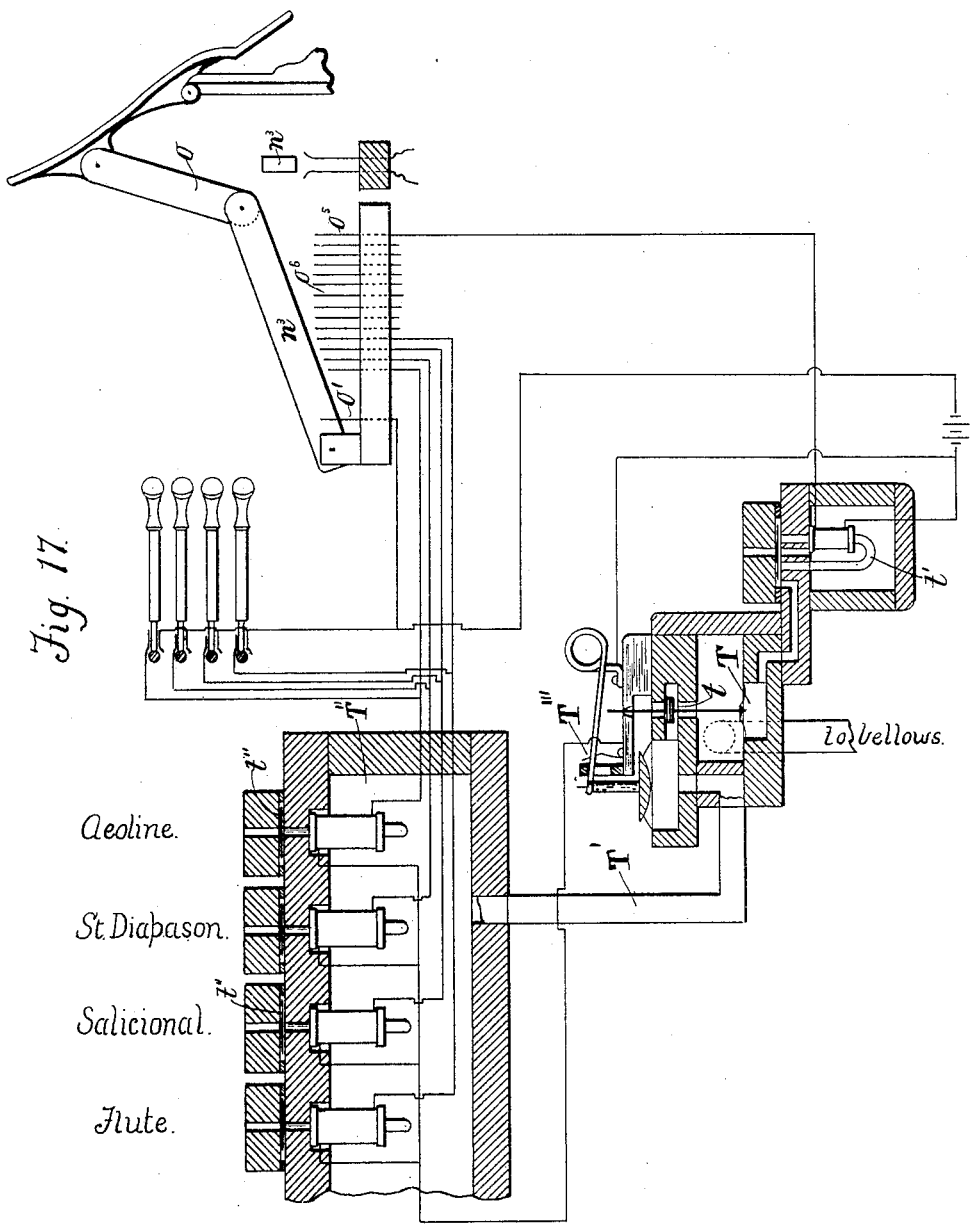

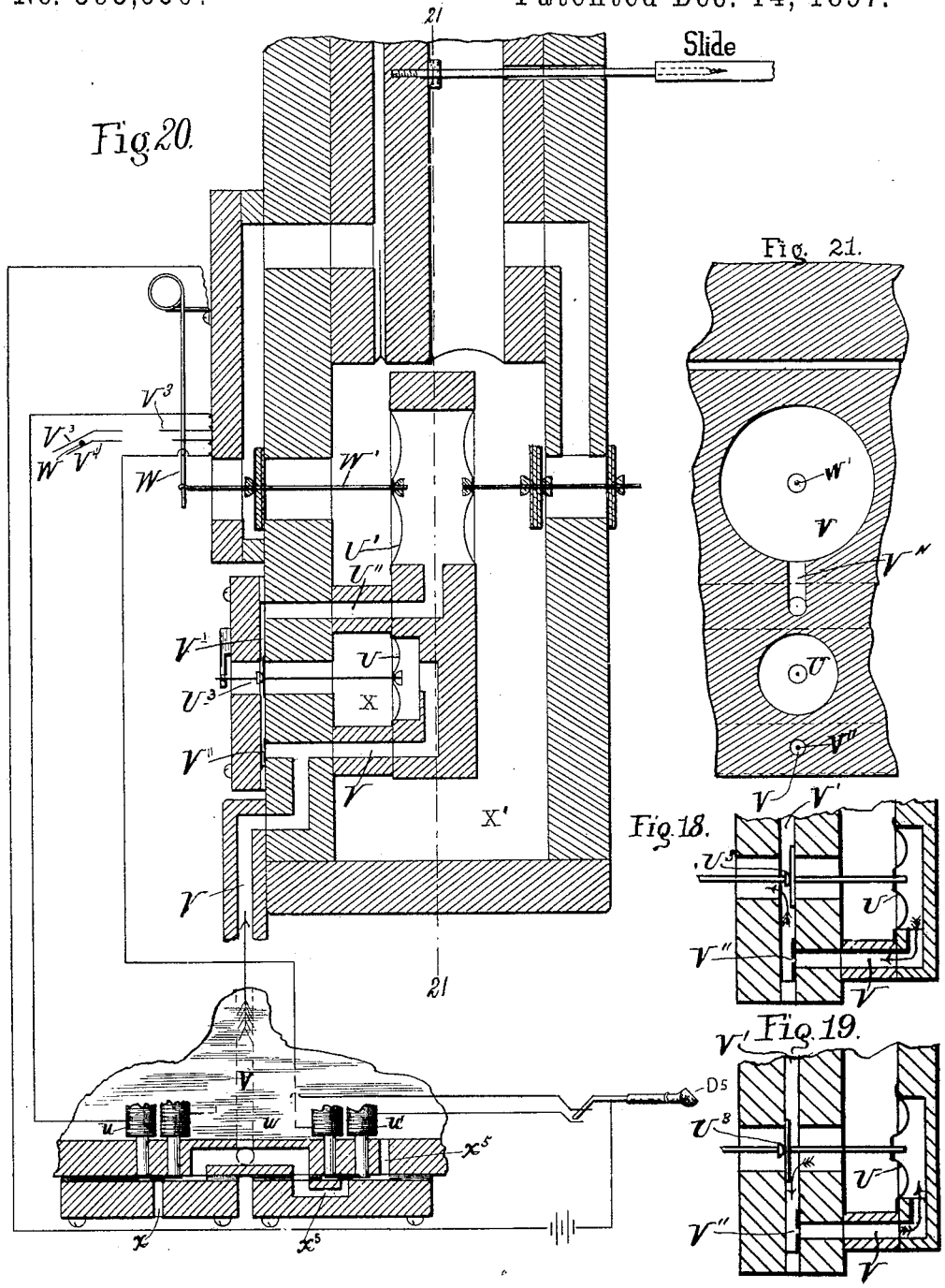

(No Model.) 6 Sheets—Sheet 6.
E. M. SKINNER.
PIPE ORGAN.
No. 595,660. Patented Dec. 14, 1897.
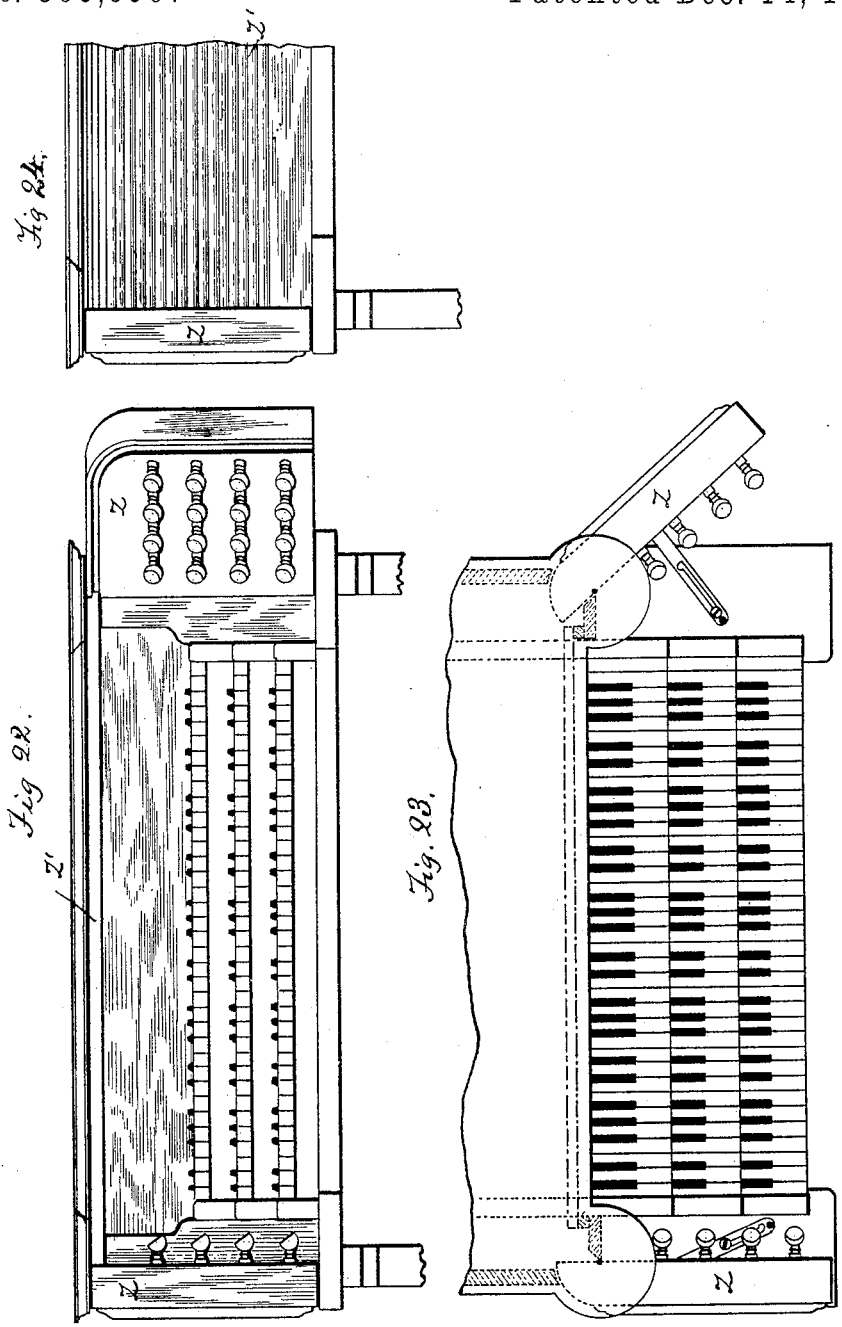
WITNESSES
Charles A. Harris
Samuel J. Craddock
INVENTOR
Ernest M. Skinner
By his Attorney
Alban Andrén

UNITED STATES PATENT OFFICE.

ERNEST M. SKINNER, OF BOSTON, MASSACHUSETTS.

PIPE-ORGAN.

SPECIFICATION forming part of Letters Patent No. 595,660, dated December 14, 1897.

Application filed February 21, 1896. Serial No. 580,183. (No model.)

*To all whom it may concern:*

Be it known that I, ERNEST M. SKINNER, a citizen of the United States, and a resident of Boston, (Dorchester,) in the county of Suffolk and State of Massachusetts, have invented new and useful Improvements in Pipe-Organs, of which the following, taken in connection with the accompanying drawings, is a specification.

This invention relates to improvements in organs; and it has for its object the eradication of the heretofore objectionable features of the electric organ-action.

It accomplishes a great reduction in the number of key-contacts, one for each key being sufficient, while in all other forms of electric action there are needed one for each key and one additional for each note coupled thereto. This is accomplished without combining with coupler pneumatics or tubular action, but by a novel arrangement of the circuits on the key-action magnets. By the employment of a veneer of metal of uniform thickness in the construction of the magnet-boxes all necessity for regulation in the armature-valves is obviated. By the single contact a perfectly simultaneous response from every division of the organ is obtained, the regulation of the contacts much simplified, and the liability of derangements reduced to a minimum. The closed circuit is employed in the stop-action with devices for preventing undue waste of electricity. By the employment of a swing-door the size of the portable consoles is much reduced, thereby making them portable in a much more practical sense of the term.

Figure 1 is a diagram showing the key-contacts and magnets and a plan of the circuits. Fig. 1$^A$ represents a detail front elevation of the pedal-contact. Fig. 2 is a plan of a key-contact. Fig. 3 is a back elevation of the same. Fig. 4 is a side elevation of the multiple-wound key-action magnet, showing the separate circuits wound on in three and four strand cables. Fig. 5 is a side elevation of the multiple-wound key-action magnet, showing the circuits wound on separate spools. Fig. 6 is a cross-section of a key-action magnet-box, showing the relation of the magnets, armatures, and windways to each other. Fig. 7 is a plan of Fig. 6 from beneath, showing the method of wiring the independent magnet-circuits and bringing them to the outside of the magnet-box. Fig. 8 is a vertical section taken upon the line 8 8 in Fig. 6. Fig. 9 is a plan of Fig. 6, showing position of removable blocks covering armatures. Fig. 10 is a plan of a portion of the metal-veneer-supporting armature-blocks. Figs. 11 and 13 are side elevations of two common forms of gang-switches, Figs. 12 and 14 being front elevations of the same. Fig. 15 is a diagram showing method of drawing two stops with one register, the coupled stop acting independently of itself. Fig. 16 is a diagram, partly in section, showing the circuits used in register or stop action, in which resistance is automatically thrown into the circuit after the armature has been moved to its "on" position or the magnetic circuit has been completed. Fig. 16$^a$ is a front elevation of the parts shown in Fig. 16, with two draw-stops, the sforzando pedal, and the several circuits in diagram. Fig. 16$^b$ is a detail showing the arrangement of contact-springs hereinafter described. Fig. 17 is a diagram, partly in section, showing a crescendo and diminuendo device with its series of contacts, some of the circuits controlled thereby, and the method of bringing on the full organ with the amount of current necessary for one stop. Figs. 18 and 19 are cross-sections of a locking or neutral pneumatic shown in Fig. 20 used on open circuits. Fig. 20 is a cross-section of a pneumatic action employed in actuating sliders, swell-folds, &c. Fig. 21 is a section upon the line 21 21 in Fig. 20. Fig. 22 is a front elevation of console, having register-supporting swing-doors. Fig. 23 is a plan of Fig. 22. Fig. 24 is a front elevation of Fig. 22, showing roll closed.

In the description of the accompanying drawings similar letters will refer to similar parts.

In Fig. 1 is shown the general scheme of the circuits in an organ having three manuals and a pedal keyboard, A A A being a swell, great, and choir, and A' a pedal key. Each key is provided with a single contact $b$, of which one-half serves as the key-spring, said spring being screwed on a metal plate $b'$, which is in circuit with the electric supply. The contact-wires $b''$ are screwed to the supporting-blocks $c$ and are placed at one side and perpendicular to the springs $b$ and inclined toward and passed over them. It will be noticed in Fig. 2 that the key is halved out or cut away at $a^3$ to make room for the springs $b$ between the keys, which serve both as key and contact springs. It will also be noticed in Fig. 1 that each bank of keys is a trifle longer on the rear end than the next bank above. This arrangement gives perfect access to all the contacts without moving the keys from their position. $c'$ is the supply-wire for the metal plates $b'$. $c''$ in Fig. 1 is a stationary bar to which the contact-wire $b''$ is attached. Any form of contact will serve equally well. The one shown is simply to illustrate the principle of my invention. The console or key-desk may be placed in any desired position in the church, the lightness and simplicity of this action making it particularly advantageous where the console is movable or portable and connected by a flexible cable.

For each set of manual and pedal keys are placed within the organ and adjacent to the magnet-box of its own manual a set of metal plates $d$, corresponding in number to the number of the keys. These plates are connected or wired in regular order with the contacts of the manual to which they belong and are made of sufficient length to give space for as many branches $d'$ or coupler-circuits as may be wished to be taken from them, said branches being thrown into circuit by the gang-switches $d^3$. (Shown in Figs. 11, 12, 13, and 14.) Fig. 11 is a side elevation, and Fig. 12 a front elevation, of switches which comprise only two members, the plates $d$, which are in circuit with the keys, each forming one member of a switch, and the contacts $d^5$, mounted on a rock-shaft $o$, each constituting the second member, which is wired directly to a corresponding magnet. The members $d^5$ are mounted upon the rock-shafts $o$ in such manner that they are directly opposite the members $d$, with which they are brought into contact by the movement of said rock-shaft. Fig. 13 is a side elevation, and Fig. 14 a front elevation, of switches which comprise three members $d^3$, $d^6$, and $d^7$. Each of the members $d^6$ is in electrical connection through one of the plates $d$ with one of the key-contacts. Each of the members $d^7$ consists merely of a contact arranged in close proximity to the member $d^6$ and wired directly to one of the series of magnets, while the third member $d^3$ is merely a pin projecting from a rock-shaft $d^8$ and acting as a bridge between the members $d^6$ and $d^7$ like a knife-switch, being forced between said members when the rock-shaft is operated. Any form of gang-switch will serve equally well. From the plate $d$ is carried the own-note wire $d''$, which operates the electropneumatic belonging to its own key.

B B B in Fig. 1 represent the key-magnet cores. They are provided with as many independent circuits or windings as there are keys to which they are to be coupled, these circuits having a common return $e$ $e$ $e$. For example, it will be seen that the swell-magnet shown in diagram in Fig. 1 (marked SW) has four separate windings, $e'$ being the winding of the own-note circuit, $e''$ of the swell to choir, $e^3$ of the swell to great, and $e^4$ of the swell to pedal. On the great magnet (marked $Gt$) will be seen the windings of the own-note $f$ and of the great to pedal $f'$. On the choir-magnet is shown the own-note $g$, the choir to great $g'$, and the choir to pedal $g''$. To these may be added as many more as may be desired. I have used eight upon each magnet and have seen no deterioration in the effectiveness or the practicability of the system. In a magnet constructed in the manner described and shown it might be supposed that induction would affect the action of the magnet detrimentally; but this is not the case. I have the magnet-windings made in two, three, and four strand cables, as shown in Fig. 4, and do not carry any of the circuits around more than one leg of the magnet. In the instance cited above I wound four circuits on each half of the magnet. This method of winding must not in any way be confounded with the practice of winding several wires on one magnet and attaching the ends together. It should be distinctly understood that, although they have a common return, the several circuits in each magnet employed by me are independent of each other, and each circuit is supplied with current from a separate source which has no connection with any of the other circuits upon the same magnet.

Fig. 5 shows another way in which the separate circuits may be placed upon the same core. The wire is wound in single strands on short spools $f'''$, which are put on the core separately one over the other. This winding is not as desirable as the one shown in Fig. 4, as there is not a uniform efficiency in the several circuits.

In the diagram Fig. 1 is shown the manner in which octave-couplers are constructed. They are identical in form with the unison-couplers, except that the wire leading from the union-plate $d$ supplies a magnet an octave above or below the key-note. For example, if the $Sw$ union-plate in the diagram is middle C the wire marked $Sw$ to $Sw^{1'}$ (when its coupler-switch was in the "on" position) operates the magnet one octave higher and the wire $Sw$ to $Sw^{16'}$ an octave lower than the middle C note, each one having, as previously described, its own circuit upon the magnet which it operates.

By placing the key-springs $b$ between the keys in the manner shown in Fig. 1 a more elastic and agreeable touch is obtained, as the arcs described by the key-spring and its point of engagement with the key are nearly identical, their centers being in the same direction from the line of movement, whereas if the springs were reversed the arcs described by the spring and the key would be in opposition to each other, causing friction and an unsympathetic touch.

In Figs. 6, 7, 8, 9, and 10 are shown the manner of constructing the magnet boxes or chests, in which once constructed all necessity for regulating or adjusting is obviated. The armature-blocks may be removed and the "floating armatures" observed and dirt or any obstruction removed. An absolute and uniform movement of all the armatures is obtained and climatic changes are not a consideration. In Fig. 6 the reference-letter C indicates a magnet-box which is shown in cross-section. The reference-letter $h$ denotes a hard-wood magnet-plate. Through perforations in this plate are forced and held the ends of the magnet-cores $h'\,h'$. The magnet-plates $h$ are cut away where the poles pass into them to allow as near an approach of the winding to the end of the magnet as possible. For each manual or clavier, or for each division of the organ separately controlled by a bank of keys, (commonly known as the "great swell" or "choir-organ,") is provided a magnet-box C, controlled and operated by the keys, one magnet and armature being provided for each note in the scale or compass. There is also provided for each division a box $T''$, the function of which is to determine or modify the effect of the operation of the magnets in box C, which it does by bringing into or taking out of effect the various stops of its own division. Between the poles are bored the inlet-holes $h''$, and directly over these and in the armature-blocks $i'$ the outlet-holes $h^3$, which holes control the key-pneumatics (not shown) through the channel $i''$, serving in turn to exhaust and inflate them as they are acted upon by the armature-valve $i$.

The armature-valves $i$ are made of thin sheet-iron, and have glued to their upper surfaces the leather bushings or wafers $i^3$, said bushings serving at the same time to insure a perfect fitting of the armatures $i$ against the ports $h^3$ and as a limit to their approach to the blocks $i'$, holding them at a sufficient distance to allow of the equal presence of the compressed air to both sides of the armatures, with the exception of the area represented by the bushings, and by this means reducing the pressure-resistance on the armatures to the attraction of the magnets.

The armature-blocks $i'$ are supported and held at a uniform distance from the magnet-plates $h$ by a veneer J, of metal or other suitable substance. The thickness of the veneer J is made equal to the thickness of the armature-valve $i$ plus the distance it (the armature) moves. Into the veneer J are cut or punched circular cells J', (shown in Fig. 10,) which are only slightly larger in size than the armature-valves. These cells serve to keep the armatures in their proper position between the windways $h''$ and $h^3$, and they so confine the compressed air as it comes through the windways $h''$ that it exerts an upward lift on the armature-valves, so that if the blocks $i'$ be removed the armature-valves will be seen to float in their cells and their action may be observed as the current is supplied or cut off, and any imperfection in their action corrected and the blocks replaced.

In most forms of electric action the armature-valve seats are adjusted with a regulating-screw, which necessitates a careful regulating of the traveling distance or excursion of all the armatures in the organ, while with my device the motion of the armatures is made exact and uniform in construction and in no way can it be disarranged or affected either by a climatic change or by a removal of the block, as the metal veneer J always preserves the necessary space between the magnet-plates $h$ and the armature-blocks $i'$.

Communication is established between the valve-cells J' and the channels $i''$ by a narrow slot $J''$ cut in the veneer from the valve-cells to a position opposite the end of channel $i''$.

Access to the magnets is obtained by means of the removable box C, which is held in its position by the thumb-screws $k$ and constantly connected with the wind-supply. Between the magnet-box C and the magnet-plate $h$ is a bushing or packing of thick soft leather $k'$, which serves the double purpose of making the box air-tight and acting as a medium through which to carry the several circuits $m$ from the inside to the outside of the magnet-boxes. This is accomplished by means of the very thin metal plates $m$, which have one end at the inside and one at the outside of the box. The soft packing $k'$ adjusts itself to the plate $h$, notwithstanding the inequalities presented by the circuit-plates $m$. Each plate $m$ acts as an inlet for one of the independent circuits previously described, said circuits having a return in the metal plate $m'$. The plates $m$ have their supply from the coupler-switches shown in diagram in Fig. 1 and in detail in Figs. 11, 12, 13, and 14, each plate being in circuit with one of the groups of switches $d^3$.

It is sometimes convenient in registration for the player to draw two stops with one register—as, for instance, a vox celeste generally requires to be drawn with a stop of similar character, such as a salicional, to get a wave or undulating effect, obtainable by tuning the latter stop slightly sharp. In Fig. 15, $m''$ represents, in diagram, the magnet of a vox celeste, and $m^3$ that of a salicional. In drawing the salicional register the wire $n$ is brought in circuit with the battery and operates the salicional magnet $m^3$ without affecting that of the vox celestis $m''$, while in drawing the vox-celestis register the wire $n'$ is brought in circuit, and the circuit, dividing at the point $n''$, passes around both magnets and draws both stops. The same principle will apply in what is known as the "augmented pedal." For example, the 8'C in the pedal bourdon may be operated by a magnet having three circuits. One operated from the 8'C pedal would be the pitch of the bourdon proper, another from the F below would belong to the register known as the "pedal quinte," and the remaining one from the low C would be called "pedal gedackt." A pedal organ made up in this way is most effective, at the same time affording great economy of space—a desideratum.

Fig. 16 is a diagram of a device for economizing in electricity where closed circuits are used. This is accomplished by automatically throwing resistance into the circuit after the armature $P^3$ has seated itself against the magnet-plate $P''$. Around one leg of the magnet is a winding $q$ of suitable proportion to properly control the armature $P^3$. Around the other leg is a winding of high resistance $S''$, connected in series with the first and having a battery-return in the metal plate $q''$. The resistance-coil $S''$ is placed upon the other leg of the magnet merely as a matter of convenience in the construction. It may be placed elsewhere, at any point inside or outside of the magnet-box. At the union of the first and second coils is provided an intermediate return $R''$, which reaches the return-plate $q''$ through the metal contact-springs $q^3$ and $r$, said springs being in contact when the armature-valve $P^3$ is blown up against the outlet $h^3$. The incline of the spring $q^3$ toward the spring $r$ is shown in Fig. $16^b$. The operation is as follows: A register is drawn from which the current passes to the magnet through the conductor $R'$ and passing around the circuit $q$ reaches the return-plate $q''$ through the intermediate circuit $R''$. The armature-valve $P^3$ is drawn to the magnet-plate $P''$, exhausting channel $R^3$. The compressed air in chamber S forces the diaphragm $S'$ outward. The eyed wire $s$, which is attached to the diaphragm $S'$ and through which passes the spring $r$, draws said spring $r$ away from contact-spring $q^3$, breaking the intermediate return $R''$, the circuit then finding a return through the high-resistance coil $S''$, the reduced current being of sufficient strength to hold the armature-valve $P^3$ against plate $P''$ after it has once been drawn to it, as the drawing strength of a magnet is in inverse proportion to the square of the distance of its armature.

Fig. 17 is a diagram showing manner of bringing on the full organ with the amount of current necessary to bring on one stop. T is a diaphragm controlling valve $t$ and controlled in turn by the magnet $t'$. T' is an air-conductor exhausting and supplying the magnet-chest T''', which contains the magnets controlling the several stops of the organ. T'''' is a contact device similar to that shown in Fig. 16. In operation, the parts being in the position shown in Fig. 17, the full-organ pedal is depressed, by which the magnet $t'$ is thrown in circuit. Its armature-valve is drawn down, exhausting the diaphragm T. The valve $t$ is drawn to position shown, by which the chamber T''' is exhausted to the outer air, allowing the armatures $t''$ to fall and every stop to come into action, being equivalent in effect to putting all the magnets in circuit. Where the organ is in widely-separated divisions, each division is fitted with this arrangement and by an automatic device the return-wire of the magnets in box T''' is broken while the magnet $t'$ is in operation, thereby throwing out of circuit any stop-action magnets that may be in action, effecting a still further electrical economy. In the crescendo device the last contact $o^5$ operates the arrangement shown in Fig. 17, by which it will be seen that the crescendo first brings all the magnets of the stop-action into circuit and then cuts them out again, preserving their effect through the magnet $t'$. The foregoing applies to the forte combination of each manual.

It is sometimes necessary, where primary batteries are the only obtainable source of electrical supply, to use what is called the "open-circuit stop-action," in which there are provided "off" and "on" magnets, which, after being thrown in circuit at the draw-stop, are automatically thrown out again by the mechanism which they control. It then becomes necessary to have the effect of their operation retained or preserved until the reverse movement is desired. For this purpose I have provided what I term the "locking" or "neutral" primary pneumatic, whose controlling medium consists of two magnets, which serve in turn to exhaust and supply the said primary pneumatic U in Figs. 18 and 19. A diagram of these magnets may be seen in Fig. 20, $u$ being the exhausting and $u'$ the inflating magnet. The pneumatic U controls a larger pneumatic U', generally of a compound type, as in Fig. 20, through the valve $U^3$ and the channel U''. The primary pneumatic U is provided with a channel V, which is in communication not only with the exhausting and inflating magnets $u$ and $u'$, but with the chamber V', controlled by its own valve $U^3$ through the very small vent or hole V''. The armatures operated upon by the magnets $u$ and $u'$ exert no influence whatever upon the channel V, except at the instant of drawing out or pushing in of a register, their circuits being automatically broken by the contact-springs $V^3$ and $V^4$, which are alternately in contact with the pneumatically-controlled return-spring W. Its operation may be briefly described as follows: A register or draw-stop (indicated in Fig. 20 by the reference-sign Ds) is drawn, which places in circuit the "on" magnet $u$, which lifts its armature-exhausting channel V through outlet $x$, and in consequence the primary pneumatic U. The valve $U^3$ is drawn inward, thereby exhausting the compound pneumatic U', which, by means of the wire W', draws the return-spring W away from the contact-spring $V^3$ and against the contact-spring $V^4$. The purpose of the two air-passages controlled by the pneumatic U' is clearly shown in Fig. 20, said purpose being to control the large-pneumatic-actuating slide illustrated in said figure. In Fig. 20 the wire W' is provided at its outer end with an eye or opening through which the contact-spring W passes and by means of which said spring is controlled. As the contact between the springs V³ and W is broken the armature controlled by magnet $u$ falls, disestablishing communication between channel V and the outer air at that point; but the primary pneumatic still retains the position given it, as it finds an exhaust through the small opening V'', which is now in communication with the outer air, as may be seen in Fig. 18. For the return movement the register is now pushed in, which places the magnet $u'$ in circuit, the current finding a return in spring V⁴, which is now in contact with spring W. The armature operated by magnet $u'$ is raised, which gives to the compressed air in magnet-chamber $w$ access to the channel V through the inlet $x^5$. The primary pneumatic U now being in equilibrium, the compressed air in chamber X forces the valve U³ outward and passing into compound pneumatic U' through U'' places it also in equilibrium. The valve W' is carried outward by the wind-pressure, as is also the contact-spring W, which breaks its contact with the spring V⁴. The two chambers X and X' are in constant communication. The magnet $u'$ then drops its armature, stopping the flow of wind into the channel V. The diaphragm U is now held in position shown in Fig. 19—that is to say, it is neutralized or in equilibrium, as the compressed air is admitted to channel V through the same opening V'' which in its other position furnishes it with an exhaust. If Figs. 18 and 19 be examined and the action of the vent-hole V'' upon the channel V be observed, it should be clear that the diaphragm U will remain in whatever position it is placed, as it is acted upon by its own valve. For the successful operation of this device it is only necessary to have the windways controlled by the magnets $u$ and $u'$ sufficiently in excess (in point of size) of the vent V'' to overcome its influence upon the primary pneumatic U', and as the vent V'' amounts to little more than a pin-hole this is not difficult.

In Figs. 22, 23, and 24 is illustrated a swing-door Z, by which I am able to greatly reduce in size and weight the form of console known as "portable." This form of console has been in use more or less, but in the case of large organs the console has ceased to be portable in the strict sense of the term, often or generally requiring three or four persons to move it. In an organ of sixty speaking stops by the combined use of the single-contact system previously described and the swing-door the weight of the console, with the pedal keyboard included, is three hundred and thirty pounds, and it can be moved about easily by one person. In Fig. 22 the roll is raised and the right-hand door Z shown open or swung outward, while the opposite one is closed. The doors are held in their extreme position by an automatic retainer operated by a concealed spring. Upon and within these doors are arranged the registers and their contact mechanism. They are hung in such a manner that there is no opening shown between the door and jamb in any position, as will be seen in reference to the plan Fig. 23. In the outer edges of the doors are provided suitable grooves for the reception of the roll $z'$, which in the closed position of the doors are continuous with grooves running back into the console and which support the roll in its raised position. In use the doors are opened out at an angle convenient for the manipulation of the stops. By this device I am enabled to reduce the width of the console to the width of the thirty-note pedal keyboard, which is less by nearly two feet than would otherwise be possible in large organs where registers are employed. Fig. 24 shows position of door and roll when closed.

In regard to the sparking at the contacts I will say that in practice I use a very low electromotive force and magnet-circuits of very high resistance, which practically obviates the spark, and as these magnets act as condensers to each other in this method of constructing the circuits when one or more couplers are in operation the sparking is absolutely prevented.

Having thus fully described the nature, construction, and operation of my invention, I wish to secure by Letters Patent and claim—

1. In a pipe-organ a series of keys A having each a side recess $a^3$ combined with spring-contact wires $b\ b''$ secured to supporting-blocks $b'$ as and for the purpose set forth and described.

2. In a pipe-organ a series of keys A having each a side recess $a^3$ combined with spring-contact wires $b\ b''$ secured to supporting-blocks $b'$, and wires having switch-plates $d$, switches $d^3$ and electromagnets in the circuit substantially as and for the purpose set forth and described.

3. In a pipe-organ action electromagnets having a plurality of independent windings, an independent energizing-circuit for each winding, including a key-contact and an intermediate switch-plate or switch, a return-wire common to all the independent energizing-circuits, and a suitable source of electric energy, substantially as described.

4. In a pipe-organ action, electromagnets having cores which are provided with multiple windings, a common return-wire to which all of said windings are connected, an independent energizing-wire for each winding, a key-contact and an intermediate switch or switch-plate interposed in said wire, and a suitable source of electric energy to the opposite poles of which the common return-wire and the independent energizing-wires are respectively connected, substantially as described.

5. In a pipe-organ action magnets having cable windings composed of two or more insulated strands of wire in electrical circuit with the various keys or stops of the organ-action substantially as and for the purpose set forth and described.

6. In an organ-action, an electrical crescendo device, consisting of a movable switch-lever combined with a contact leading to and through a battery or electric generator, and a succession of contacts, each in series with a magnet controlling one of the various stops and couplers of the organ-action, substantially as described.

7. In a pipe-organ, in combination, a magnet-box containing an electromagnet an armature-block above said box a perforated veneer interposed between said box and block and a movable armature-valve arranged in said perforated veneer substantially as and for the purpose set forth and described.

8. In a pipe-organ in combination a magnet-box containing an electromagnet, an armature-block above said box, a perforated veneer interposed between said box and block and a movable armature having a central valve adapted to close an opening leading to the exit-opening, substantially as and for the purpose set forth and described.

9. In a pipe-organ action in combination a magnet-box containing an electromagnet, a magnet-plate secured to said box and metal circuit-plates arranged between said box and magnet-plate for the purpose of establishing electrical connection between the inside and outside of said box as herein set forth and specified.

10. In a pipe-organ action, the combination with a battery or other generator of electricity, of an electromagnet, a winding $q$ for the same, a resistance-coil $S''$ in series with the winding, an intermediate return $R''$ common to said winding and resistance-coil and connected to a return-plate $q''$, a return-circuit for said electromagnet, a pneumatic-diaphragm $S'$ and contact-springs $q^3$ and $r$, on the return-plate, whereby the resistance-coil $S''$ in the return-circuit is normally shunted through the intermediate return $R''$, but is thrown in series with the winding $q$ while the intermediate return $R''$ is opened at $q^3$, $r$ as soon as the pneumatic operates, substantially as described.

11. In an organ-action, the combination with a valve $t$, of a pneumatic diaphragm or bellows T, to control said valve, a magnet-chamber $T''$ containing magnets controlling stops or couplers, and an automatic device to break the return-wire of said magnets simultaneously with the exhaustion of said chamber by said valve $t$, substantially as described.

12. In an organ-action the combination with a pneumatic-diaphragm, U, of an air-passage V, having a small vent, or air-passage $V''$ and a pair of electromagnets $u$, $u'$, and armature-valves, serving in turn to exhaust and inflate the air-passage V, substantially as described.

13. In an organ-action a pneumatic-diaphragm U and channels V V' and a pair of electrically-operated armature-valves serving respectively as exhausting and inflating devices for the pneumatic-diaphragm U, in combination with a vent or windway $V''$ serving as a communication between channels V and V' substantially as and for the purpose set forth and described.

14. In an organ-action a pneumatic-diaphragm U and channel V and a pair of electrically-operated armature-valves serving respectively as exhausting and inflating devices for the pneumatic-diaphragm U, and a vent $V''$ combined with the electrical connections $V^3$ and $V^4$ and pneumatically-controlled contact-spring W substantially as and for the purpose set forth.

15. In an organ-action the combination with a diaphragm or equivalent pneumatic U and a valve $U^3$ connected thereto, of an air-passage V controlling said pneumatic, a channel $V'$ controlled by said valve, and a means of communication $V''$, between said passage and channel, substantially as and for the purpose set forth.

16. In an organ-console pivotal doors Z Z having grooves for the reception of the roll or lid Z', and containing and supporting within themselves the draw-stops or registers and their suitable contact devices substantially as and for the purpose set forth.

In testimony whereof I have signed my name to this specification, in the presence of two subscribing witnesses, on this 17th day of February, A. D. 1896.

ERNEST M. SKINNER.

Witnesses:
ALBAN ANDRÉN,
CHARLES A. HARRIS.